(12) United States Patent
Pannell

(10) Patent No.: US 7,580,609 B1
(45) Date of Patent: Aug. 25, 2009

(54) FIBER INTENSITY REDUCING DEVICES AND RELATED SYSTEMS

(75) Inventor: Christopher N. Pannell, Orlando, FL (US)

(73) Assignee: Gooch & Housego PLC, Somerset (GB)

( * ) Notice: Subject to any disclaimer, the term of this patent is extended or adjusted under 35 U.S.C. 154(b) by 0 days.

(21) Appl. No.: 12/143,568

(22) Filed: Jun. 20, 2008

(51) Int. Cl.
G02B 6/26 (2006.01)
(52) U.S. Cl. .................................... 385/140; 385/31
(58) Field of Classification Search ............... 385/15, 385/31, 39
See application file for complete search history.

(56) References Cited

U.S. PATENT DOCUMENTS

| | | | | |
|---|---|---|---|---|
| 4,327,965 | A | * | 5/1982 | Black .......................... 385/123 |
| 4,701,011 | A | | 10/1987 | Emkey et al. |
| 4,913,507 | A | * | 4/1990 | Stamnitz et al. ............. 385/122 |
| 4,923,276 | A | * | 5/1990 | Wells ....................... 250/206.2 |
| 4,962,988 | A | | 10/1990 | Swann |
| 4,973,125 | A | * | 11/1990 | Normandin .................. 385/27 |
| 5,133,709 | A | | 7/1992 | Prince |
| 5,304,228 | A | | 4/1994 | Prince |
| 5,371,826 | A | * | 12/1994 | Friedman ..................... 385/115 |
| 5,434,942 | A | * | 7/1995 | Jackel et al. ................. 385/122 |
| 5,500,917 | A | * | 3/1996 | Daniel et al. ................. 385/99 |
| 5,682,453 | A | * | 10/1997 | Daniel et al. ................. 385/99 |
| 6,284,805 | B1 | | 9/2001 | Brown |
| 6,397,636 | B1 | * | 6/2002 | DiGiovanni et al. .......... 65/395 |
| 6,471,417 | B1 | | 10/2002 | Wang et al. |
| 6,590,698 | B1 | * | 7/2003 | Ohtsuki et al. .............. 359/326 |
| 6,658,896 | B2 | * | 12/2003 | Galarza ....................... 65/408 |
| 6,807,344 | B2 | * | 10/2004 | Galarza ....................... 385/43 |
| 6,883,975 | B2 | * | 4/2005 | Clarkin et al. ................ 385/78 |
| 7,031,567 | B2 | * | 4/2006 | Grinderslev et al. .......... 385/34 |
| 7,146,075 | B2 | * | 12/2006 | Tinch et al. .................... 385/33 |
| 2002/0186942 | A1 | * | 12/2002 | Bubnov et al. ............... 385/123 |

OTHER PUBLICATIONS

Sinha, S., et al., "Investigation of the Suitability of Silicate Bonding for Facet Termination in Active Fiber Devices" Optics Express, Oct. 1, 2007, vol. 15, No. 20, pp. 13003-13022.

* cited by examiner

*Primary Examiner*—James P Hughes
*Assistant Examiner*—Peter Radkowski
(74) *Attorney, Agent, or Firm*—Patents On Demand, P.A.; Neil R. Jetter

(57) ABSTRACT

A fiber intensity reducer comprises a guided system fiber including a core and an outer cladding layer, an unguided fiber intensity reducing (FIR) section including a first fiber "end cap fiber" having a first end and a second end attached at its first end to the system fiber. A bond region is between the first end of the first fiber and the system fiber. The FIR section provides a softening point of at least 700° C. throughout and provides a sufficient transverse dimension along its entire length so that a beam of radiation received from the system fiber expanding therein avoids an interface with the air along its entire length. In one arrangement, the FIR section includes an outer capillary on the end cap fiber, wherein the capillary and the end cap fiber provide refractive index matching.

25 Claims, 3 Drawing Sheets

US 7,580,609 B1

FIBER INTENSITY REDUCING DEVICES AND RELATED SYSTEMS

FIELD OF THE INVENTION

The invention relates to fiber intensity reducers, and related optical systems including one or more such reducers.

BACKGROUND

In a variety of applications an optical signal is coupled between an optical fiber and a mating optical component. In many of these applications there is an optical power limit that limits the optical power that can be used both in and out of optical fiber. Above the power limit, the fiber is subject to catastrophic destruction of the fiber core, or other optically-induced damage.

Tapered optical connectors are known for expanding guided fields propagating in optical fibers. Conventional tapers guide the light in the transition region by reflections at the air-glass interface along the outer surface of the expanding taper guide. Various conditions are placed on the rate of increase of diameter with axial distance. In particular, one condition often imposed is that the taper be gradual enough to ensure smooth evolution of the guided mode of the fiber into a larger guided mode, without the substantial excitation of spurious optical modes in the taper. Such tapers are described as being substantially "adiabatic".

In some cases, especially in fiber power beam delivery systems or high power fiber laser systems, the fiber is inherently multimode, i.e. the fiber core diameter and core/cladding refractive indices are such that many guided modes propagate. In this case the term "spot size" is often used to describe the region of fiber (i.e. core+small overspill into cladding) where the light intensity is substantial and consists of a superposition of many optical modes of the fiber. In this case, if a taper is formed or bonded to a fiber end, it will be with the intention of gradually increasing the spot size formed by this mixture of modes, simultaneously decreasing the optical intensity so that it has fallen to a value unlikely to cause optical damage when the beam encounters the final glass/air interface. Taper lengths to be effective for gradually increasing the spot size are generally on the order of several cms, making such devices impractical in certain applications. Moreover, the mode of operation of tapered devices described above undesirably results in optical reflections which tend to distort the beam emerging from the air/glass interface which reduces the ability of the device to form a free space beam of high quality to the right of the final surface What is needed is a new fiber intensity reducing device for increasing the optical power that can be reliably launched into and out of optical fibers.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims. A fiber intensity reducer comprises a guided system fiber comprising a core and an outer cladding layer, an unguided fiber intensity reducing (FIR) section comprising a first fiber (referred to as an "end cap fiber") having a first end and a second end attached at its first end to the system fiber. A bond region is between the first end of the first fiber and the system fiber. The FIR section provides a softening point of at least 700° C. throughout and provides a sufficient transverse dimension along its entire length so that a beam of radiation received from the system fiber expanding therein avoids an interface with the air along its entire length (except at the output face of the FIR).

In one arrangement, the FIR section comprises an outer capillary on the end cap fiber, wherein the capillary and the end cap fiber provide refractive index matching. As used herein, "refractive index matching" between the end cap fiber and the outer capillary generally refers to a refractive index match (refractive index of the capillary-refractive index of the end cap fiber) equal to from −0.001 to +0.05 at the operating wavelength, or through the operating wavelength range. This range is asymmetric and more limited for the end cap index>capillary index case since operational problems are generally more serious when the capillary is at a lower relative index (due to waveguiding) than when the end cap is at a higher relative index. Although most devices according to the invention are expected to be designed to operate at a single wavelength, if the device is used over a band of wavelengths, then the device will generally fulfill the above refractive index matching condition on the indices whatever this wavelength range is, such as 100 nm for a typical "broadband" optical source.

DETAILED DESCRIPTION

Figure 1A:
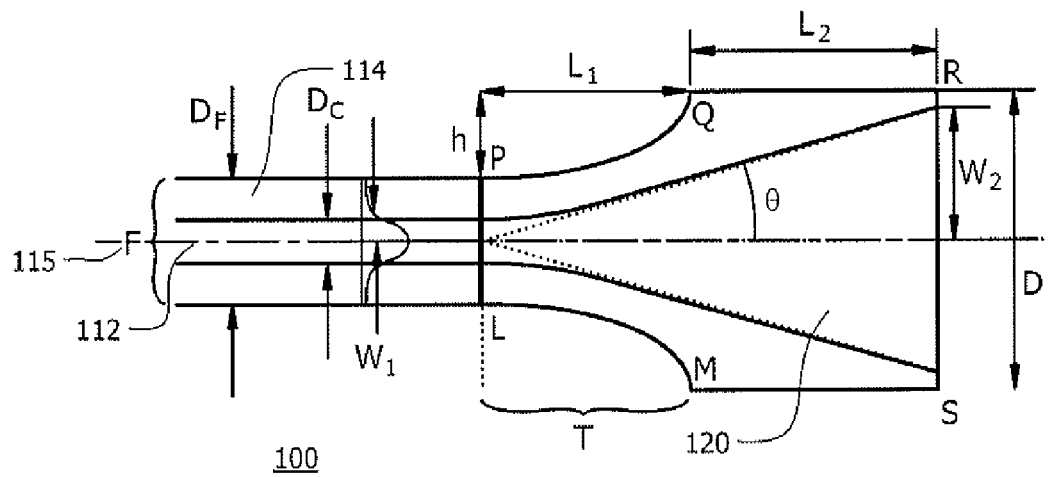
FIG. 1A is a schematic side cross sectional view of a fiber intensity reducer system comprising a fiber intensity reducer (FIR) according to an embodiment of the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

A fiber intensity reducing system comprises a guided system fiber having a core and a cladding layer. The system fiber has an outer diameter dimension defined by the cladding layer. In one embodiment the core is a single mode core (e.g. <12 μm diameter), and in another embodiment a Large Mode Area (LMA) fiber, which is typically 10 to 25 μm in diameter. As known in the art, although an LMA fiber is typically capable of supporting multiple modes, only the lowest mode is excited substantially, and care is taken by the manufacturer (e.g. laser manufacturer) to ensure this is the case.

An unguided fiber intensity reducing (FIR) section comprising a first fiber "end cap" has a first end and a second end that is attached at its first end to the system fiber. A bond region is between the first end of the first fiber and the system fiber. The FIR section provides a softening point of at least 700° C. throughout, thus excluding materials such as solder glasses which generally have softening points of about 500° C., and epoxies which are known to have softening points even lower than that of solder glasses. Epoxies are also generally incapable of handling the high optical intensities generally required. The FIR section also provides a sufficient transverse dimension along its entire length so that a beam of radiation received from the system fiber expanding therein avoids an interface with the air along its entire length. As a result, reflections at the air interface of the FIR section are avoided while the mode field is allowed to expand, thus lowering the optical intensity.

FIG. 1A is a schematic side cross sectional view of a fiber intensity reducer system 100 comprising an unguided fiber intensity reducer (FIR) end cap 120 attached to a system fiber 115, according to an embodiment of the invention. System fiber 115 comprises core 112 and outer cladding 114. FIR 120 reduces the optical intensity as compared to the optical intensity of the fiber mode propagating in the fiber 115 before it encounters the air/glass interface shown in FIG. 1A as RS. Fiber 115 having diameter DF is bonded (e.g. by fusion splicing) to FIR 120 at an interface identified in FIG. 1A as PL. FIR 120 comprises silica or other material matching fiber 110 and has a dimension PQRSML. FIR 120 will generally have rotational symmetry. FIR 120 can be bonded to fiber 115 prepared as a prepared fiber end using known bonding techniques such as fusion splicing. FIR 120 is generally <15 mm in length, such as 1 to 10 mm in length.

In fusion splicing, as known in the art, two components, typically two fibers which have been "cleaved" so as to produce two clean and perpendicular end-faces, are placed in a specially designed micropositioner. The ends are automatically aligned, then heat is applied to soften the glass, usually by an electric arc. The programmed micropositioners move the semi-melted ends together along the axial direction, so that surface tension takes effect, then pulls them back axially once they have "stuck" so as to leave a cylinder which is neither bulging or "necked", but is the same as the original value. If performed properly, this process produces joins of high mechanical strength and negligible optical losses, and high resistance to optical damage, so that the limiting factor is generally the optical damage threshold of the last glass-air interface, shown as surface RS in FIG. 1A and subsequent FIGs.

In one embodiment FIR 120 can be made from silica "canes", i.e. silica rods typically 0.5 to 2 mm in diameter. One end of the FIR 120 could be etched, ablated or heated/pulled so that its diameter becomes substantially the same as the system fiber 115 (e.g. about 10 mm). If FIR 120 is made using some kind of pulling rig (e.g. a coupler rig) the hot zone generally needs to be short enough to allow a sufficiently fast diameter transition to be fabricated. Sharp transitions are favored if the end-limits of the moving hot zone increase with time. Assuming a single mode fiber 112 is used, the far field rays are generally asymptotic to a cone of half angle approximately 3° for silica at 1 micron, assuming a starting waist radius of 4 microns. Thus, for example, a cane of 1 mm diameter can be used, and pulled down to form a transition region (taper region) of the order of 0.5 to 5 mm in length, or etched in HF, or by ablating the end using a $CO_2$ laser until a portion of the cylinder was reduced to the essentially the same diameter as fiber 115. A combination of these techniques may also be used.

The fusion splice or other bond is made along PL, where the neck of the FIR 120 is machined or otherwise prepared so as to be substantially (e.g. within 5%) the same diameter as the outer diameter of the fiber 115, $D_F$. The core of fiber 112 is represented in FIG. 1A, to the left of the interface PL, as having a characteristic width $W_1$ which is not generally the same as the radius of core 112 ($D_C/2$) because the evanescent field is free to penetrate a finite distance into the cladding 114. It is customary to specify the width of the mode field distribution either by the $1/e^2$ intensity points, or 95% intensity points, reckoned relative to the on-axis intensity. Usually, in a single mode fiber, the fundamental mode field is approximately Gaussian. To the right of the interface PL, the material of the FIR 120 into which the optical field expands is substantially homogeneous and is thus non-guiding. The mode amplitude distribution along the surface PL at the end of FIR 120 therefore generally propagates according to the laws of diffraction in a homogeneous medium (i.e. unguided), unlike the radiation to the left of PL, which propagates according to the laws governing an optical waveguide. The optical field to the right of PL is shown expanding until it attains a substantially larger characteristic radius $W_2$ ($W_2 >> W_1$) at the air/material interface represented by RS in FIG. 1A. Because the characteristic transverse dimensions of the material to the right of the interface PL are substantially greater, such as at least 2 times, than that of the core 112, the intensity of the radiation at the surface RS is much lower than at the end of the fiber 110 PL, greatly reducing the tendency for optical radiation induced damage to occur.

Significantly, the FIR 120 portion to the right of the interface PL is made in the form in order to provide both (i) mechanical compatibility at PL which facilitates fusion splicing or other bonding (essentially the same diameter) and (ii) a transition region T of length L1 to allow the FIR 120 to expand in a relatively short transition region (labeled as "T") from the fiber 115 outer diameter PL to its full diameter RS. In one embodiment the transition region T is from 0.5 to 5 mm. Thus, condition (ii), the transition region 7 is not only formed for mechanical (jointing) considerations, but also provides a diameter along its entire length that increases faster than the optical field diameter as one moves to the right along the axis line from the interface PL. If this condition is not met, then the expanding optical field would encounter the outer surface of FIR 120 at some position to the right of PL. This would generally be undesirable as optical reflections would then occur at the glass-air interface which would distort the beam emerging from the face RS and would reduce the ability of the device to form a free space beam of high quality to the right of the final surface RS.

Figure 1B:
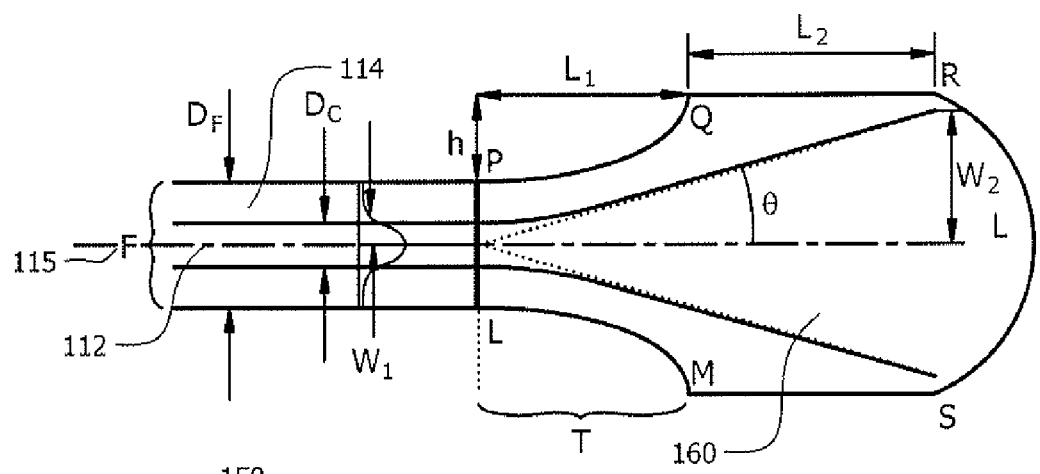
FIG. 1B shows a schematic side cross sectional view of a fiber intensity reducer system comprising a FIR having an attached lens according to an embodiment of the invention.

FIG. 1B shows a schematic side cross sectional view of a fiber intensity reducer system 150 related to system 100 shown in FIG. 1A comprising a FIR 160 having an attached lens according to an embodiment of the invention. The lens (L) in conjunction with FIRs according to the invention allow collimated beams to be formed for improved operation of a variety of devices and applications, including fiber coupled modulators (e.g. for AO Q-switches) and to facilitate re-launching of light back into the fiber. The FIR 160 shown in FIG. 1B can be integrally formed by shaping the FIR section material (e.g. silica) in order to form, the curved interface that defines L. This arrangement has the potential advantages over non-integral lenses of mechanical stability, reduced cost, smaller size, and the reduction in the number of glass-air interfaces, all of which generally have to be antireflection coated. As an alternative to integral formation, the lens L can be bonded to the FIR section. However, the integrated or bonded arrangement can create a problem of tolerancing. Specifically, the distance from PL to the lens (L) must now be tightly controlled, because if this distance is not substantially equal to the focal length of the lens formed on the FIR, a collimated beam will not be formed. In the case of a Q-switch application, this can have the effect of lowering the throughput of the Q-switch in the ON state, or alternatively, increasing the insertion loss. Alternatively, the lens can be spaced apart from the FIR. This alternate arrangement generally eliminates the above described tolerancing concerns.

Another method for bonding the FIR 120 to system fiber 115 is mechanical splicing. However, mechanical splicing generally leads to an insertion loss up to about 0.5 dB, as compared to an insertion loss of generally <0.1 dB for fusion splicing. A silicate bonding process, or more generally low temperature material bonding techniques, may also be used for bonding lenses to FIR sections. Silicate bonding is a process that uses a silicate material, heat and pressure to bond glasses together to make glass/glass joins. The silicate material can be a thin layer of sodium silicate which is sandwiched between respective optically flat surfaces. Apart from the sodium ions, which remain and will change the refractive index, the glass joint formed in this way is true silica.

Figure 2:
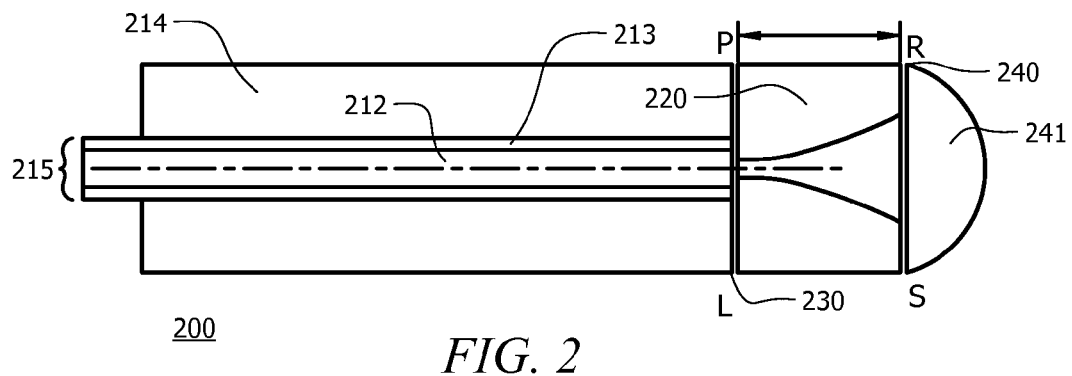
FIG. 2 is a schematic side cross sectional view of a FIR system according to another embodiment of the invention which comprises a FIR attached to a system fiber for reducing the optical intensity of one or more fiber modes propagating in the fiber before it encounters an air/glass interface.
Figure 3:
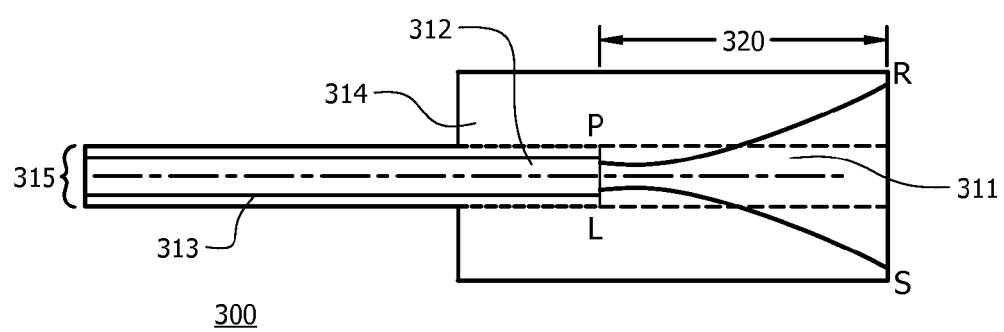
FIG. 3 is a schematic side cross sectional view of a FIR system according to another embodiment of the invention which comprises a FIR attached to a system fiber for reducing the optical intensity of one or more fiber modes propagating in the fiber before it encounters an air/glass interface.

FIG. 2 is a schematic side cross sectional view of a fiber intensity reducer system 200 according to another embodiment of the invention which comprises a fiber intensity reducer (FIR) "end-cap" section 220 attached at PL to a guiding system fiber 215 comprising optical fiber 212 and cladding 213, having an outer capillary 214 thereon. FIR section 220 reduces the optical intensity of one or more fiber modes propagating in the optical fiber 212 before it encounters an air/glass interface shown as RS. Bonding along PL may be accomplished, for example, using polymers, sol-gels, solder glass or a low temperature material bonding technique such as silicate bonding. Bond region 230 is shown as PL in FIG. 2. Capillary 214 surrounds cladding 213 and can be formed thereon using a conventional collapsing process. In a conventional collapsing process, the system fiber 215 is inserted into a hole in a capillary 214 from one end and is threaded through so that it pokes out of the other side before heating to collapse the capillary 214. If the fiber 215 is "capped" according to embodiments of the invention with a few mms of core-less (neglecting the air as cladding) silica fiber of the same diameter, such as to realize fiber intensity reducer system 300 described below, then the length of the end cap can be measured and arranged for the end of the fiber cap to be flush with the end of the capillary 214. This is shown in FIG. 3 described below. In practice, the surface PIL in FIG. 2 is generally optically polished to render it optically flat prior to bonding on the end-cap 220. That way it is known where the interface (e.g. fusion splice from fiber 215 to end cap 220) actually is relative to the end of the capillary 214. The far end of the capillary 214 is then heated, and the inner portion of the capillary softens and flows, removing the small residual gap between the cladding 213 of fiber 215 and inner wall of the capillary 214 due to surface tension. The collapse process then "walks" the hot zone along from one end, taking the meniscus with it.

FIR end cap 220 is shown having a uniform diameter which is sized to match the outer diameter of capillary 214. Thus FIR 220 has a diameter greater than fiber 215. The length of FIR 220 is such optical field diameter propagating therein is less than the diameter of FIR 220 as shown in FIG. 2 to avoid reflections at the silica/air interface. An optional lens 241 for beam collimation is shown bonded using bond region 240 onto FIR 220 at RS (after the mode field has expanded).

FIG. 3 is a schematic side cross sectional view of a fiber intensity reducer system 300 according to another embodiment of the invention. System 300 comprises fiber intensity reducer (FIR) end cap section 320 comprising core-less fiber 311 attached to optical system fiber 315 at PL for reducing the optical intensity of one or more fiber modes propagating in the optical fiber 312 before it encounters the air/glass interface shown as RS.

Optical system fiber 315 comprises optical fiber 312 and cladding 313. FIR comprises a core-less (again neglecting the air as a cladding) fiber end-cap 311 which has essentially the same diameter as system fiber 315. The attachment at PL can be provided by a fusion splice or other bonding process, including silicate bonding or a related low temperature bonding process. A continuous capillary section 314 is collapsed on and fused to fiber 315 proximate to PL, the attachment bond at PL, and the full length of the fiber end-cap 311. Fused and collapsed regions are shown by the dashed lines provided in FIG. 3.

One method for forming continuous capillary section 314 is following bonding to form the bond at PL, a common capillary 314 is applied to cover both the system fiber 315 proximate to PL and the entire length of fiber end cap 311. One capillary arrangement that may be used for this purpose is a capillary that has a silica outer "shell" of defined diameter, and an inner annular region that provides a lower melting point material as compared to the silica shell. The lower softening point material can in one embodiment comprise borosilicate glass, which has a softening point of about 820° C., as compared to the softening point of silica which is about 1650° C. In such a capillary arrangement, using a laser as a heat source in the collapse process the higher melting point silica capillary shell does not change its outer diameter appreciably during the collapse process (e.g. it does not soften) which keeps the fiber 310/311 (in one embodiment fusion spliced together) straight during the collapse process (so that kinks or bends are not formed).

In certain applications, the presence of a refractive index lower than that pure silica, such as boron-doped glass described relative to system 300, can result in degraded performance since this arrangement will tend to trap and guide light rays which lie close to the axis of fiber 311. One alternative is to use a capillary 314 that is a pure silica capillary throughout. However, this will generally require a higher temperature collapsing process which can result in the fiber 312/311 from developing kinks or bends, and may result in the outer diameter of capillary 314 changing as a result of the collapsing process.

In another arrangement the borosilicate glass inner material is replaced by a material that maintains the lower softening point as compared to silica, but provides a refractive index that essentially matches pure silica (e.g. being within +0.0001 of one another), or is a little higher than pure silica (e.g. 0.001 to 0.01 higher). For example, germanium (Ge) doping can be used to increase the refractive index of the boron doped glass while still maintaining the reduced softening temperature. Accordingly, a boron/germanium co-doped material, having a Ge content sufficient to raise the refractive index of the inner capillary material to at least essentially that of pure silica can be used on one embodiment.

Several applications for embodiments of the invention involve a pair of fiber intensity reducing systems. A pair of such systems, facing each other and suitably aligned, can provide a low-loss optical transition. Such applications couple a fiber guided mode to a free space beam (from a first FIR system according to the invention) to another fiber guided mode (via a second FIR system according to the invention). In typical applications, devices such as fiber coupled modulators (e.g. for Q-switches, such as for Q-Switched laser systems), electro-optic modulators, or fiber isolators are placed in the collimated free space beam portion.

One exemplary application for FIR systems according to the invention is for fiber coupled modulators (e.g. in the laser cavity for Q-switched fiber lasers), such as using a bulk acousto-optic (AO) Q-switch or "Bragg cell". Currently fiber collimators are available which limit the average optical throughput to approximately 2 Watts. 2 Watts is insufficient for certain higher power laser applications.

Figure 4:
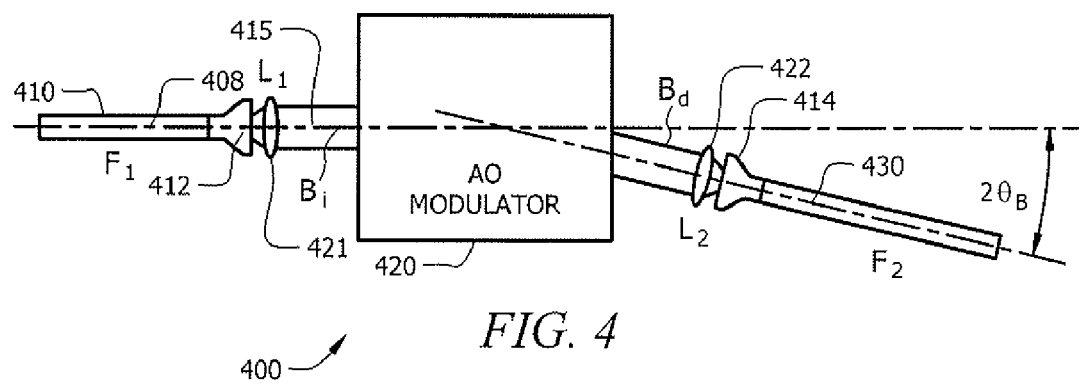
FIG. 4 shows a depiction of a fiber coupled modulator system according to an embodiment of the invention that in one embodiment can be used to Q-switch a fiber laser.

FIG. 4 shows a depiction of a fiber coupled AO modulator system 400 that can be used to force a fiber laser to produce pulses and control the shape of those pulses, with Q-switching being a special case of forcing and shaping laser pulses. FIG. 4 shows a depiction of a fiber coupled AO modulator system 400 that can be used to Q-switch a fiber laser. This arrangement avoids having the guided mode exit directly from the fiber core into air, by allowing the fiber mode to expand in an unguided region before it hits the air/glass interface. This reduces the likelihood of optical damage occurring at the fiber end (e.g. by the settling of dust particles on the fiber core), and allows a larger amount of optical power in and out of the relatively small size of single or few-moded optical fiber cores (e.g. LMA or single mode fiber) by reducing the optical intensity before a glass/air boundary is encountered by the optical beam.

In the fiber coupled AO modulator system 400, the light 408 guided in the input optical fiber 410. After exiting the FIR 412 at the distal end of fiber 410, the beam is diverging and a lens 421 is used to collimate the beam which forms the collimated input free space beam 415 (Bi) to the AO modulator 420. When AO modulator 420 is switched ON, the input beam Bi is diffracted through the Bragg angle $\theta_B$ to form the diffracted beam $B_d$ which is then incident on a suitable lens 422, which focuses the diffracted optical beam onto the output fiber 430 via the output FIR 414. With the Q-switch 420 switched OFF, no diffracted beam is produced, and no appreciable light is coupled from input fiber 410 to the output fiber 430.

Bulk-optic modulators are also available in electro-optic form, and could be used in an analogous manner to the AO modulator 420 described above. In the case of electro-optic modulators (e.g. EO Q-switches or "Pockels cells"), no diffraction is produced. However, the device is still a 2-port device generally requiring conditioned optical beams as input.

Figure 5:
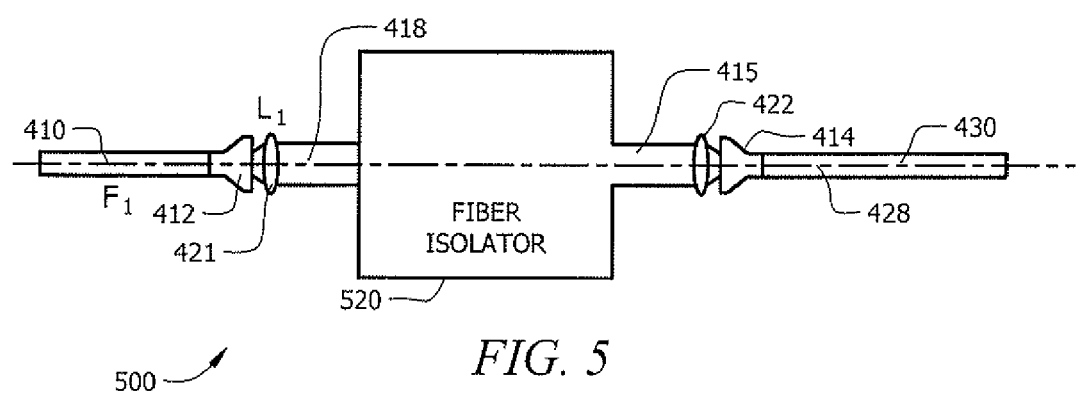
FIG. 5 shows a depiction of the use of the collimator described herein in a fiber coupled isolator system according to an embodiment of the invention which can be used to protect a laser from stray reflected light.

FIG. 5 shows a depiction of a fiber isolator system 500 which can be used to protect a laser (not shown) from stray reflected light. Fiber isolator 520 receives a collimated free space beam 415 output by a first FIR section 412 and collimated by lens 421. After collimation by lens 421, and passing fiber isolator 520 and then being collimated by lens 422, the free space beam 415 reaches second FIR section 414 and becomes fiber guided mode beam 428 in output fiber 430.

The optical isolator 520 is a standard component for allowing optical radiation to pass in only one direction; it substantially blocks optical radiation passing in the reverse direction. In bulk-optic form such a device has been around for many years. In recent years it has become important to have optical fiber versions of this component, but because the device relies on physical properties not easily realizable in an optical fiber (Faraday rotation), and particularly for high power laser operation, it is generally still necessary to create a fiber version by placing a bulk-optic isolator between two collimators. This bulk-optic isolator will generally contain a crystal held in a magnetic field which causes rotation of the state of optical polarization, and several waveplates and polarizers. There are many variations of this basic design known to those having ordinary skill in the art, and all will generally work in this context.

In operation, the input FIR/collimator 412 conditions the optical radiation guided in the input fiber 410 into a substantially collimated beam of the appropriate diameter (typically a few hundred μm to several mm). The collimated beam then through the isolator 520 and is re-launched (re-coupled) into the output fiber 430 by means of the output collimator 422. Some isolators need a given input polarization state in order to work properly, and other isolators are designed to be polarization-independent, i.e. they can be used with arbitrary states of input polarization. If the isolator 520 is of the simpler polarization-dependent type, then the fiber used to make the input 412 and output collimator 422 will be polarization maintaining fiber, chosen so as to preserve a linear polarization state throughout. In all other ways the FIRs/collimators will be constructed as previously described, except that polarization-maintaining fiber will be used in their manufacture. The end caps, lenses etc will be as described above. However, in many fiber lasers, a linear and fixed input polarization state is not available, and so polarization-independent isolators will generally be used. In this case, that is generally no need for a polarization-maintaining fiber for the FIRs/collimators.

By substituting an HO modulator for fiber isolator 520, a fiber coupled EO modulator system would be provided. Other optical systems that can benefit from embodiments of the invention include high power optical switches and routers using Micro Electromechanical (MEMS) elements such as micro-mirrors, or sample cells in which it is desired to pass high power optical beams through a sample of gas, solid or liquid for the purposes of analysis, the light being delivered to the cell and carried from the cell by optical fibers.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and/or the claims, such terms are intended to be inclusive in a manner similar to the term "comprising."

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the following claims.

I claim:

1. A fiber intensity reducer, comprising:
   a guided system fiber comprising a solid core and an outer cladding layer;
   an unguided fiber intensity reducing (FIR) section comprising a first fiber having a first end and a second end attached at its first end to said system fiber; and
   a bond region between said first end of said first fiber and said system fiber,
   wherein said FIR section provides a softening point of at least 700° C. throughout and provides a sufficient transverse dimension along its entire length so that a beam of radiation received from said system fiber via said bond region expanding therein avoids an interface with the air along said entire length.

2. The fiber intensity reducer of claim 1, wherein said first end of said first fiber matches an outer diameter dimension of said system fiber, and said second end has a diameter at least 2 times greater than said outer diameter dimension.

3. The fiber intensity reducer of claim 1, wherein said length of said FIR section is 0.5 to 10 mm.

4. The fiber intensity reducer of claim 1, wherein said core is <25 μm in diameter.

5. The fiber intensity reducer of claim 1, wherein said FIR section consists essentially of said first fiber, wherein said bond region comprises a silicate comprising bonding layer between said system fiber and said first end.

6. The fiber intensity reducer of claim 2, wherein said FIR section includes a lens bonded to or integrated with said second end.

7. The fiber intensity reducer of claim 1, wherein said bond region comprises a fusion spliced region bonding said system fiber and said first end.

8. The fiber intensity reducer of claim 1, wherein said FIR section further comprises a continuous silica comprising capillary sleeve collapsed onto and extending from said entire length of said first fiber, said bond region, and over said cladding layer of said system fiber adjacent to said bond region, said capillary having a refractive index matching that of said first fiber.

9. The fiber intensity reducer of claim 8, wherein said capillary comprises an outer silica shell and an inner portion comprising a lower softening point material as compared to a softening point of said silica shell.

10. The fiber intensity reducer of claim 9, wherein said lower softening point material comprises a boron doped glass.

11. The fiber intensity reducer of claim 9, wherein said capillary comprises boron-doped silica and another component for increasing a refractive index of said boron-doped silica for at least matching of a refractive index of silica.

12. The fiber intensity reducer of claim 11, wherein said refractive index of said lower softening point material is between said refractive index of silica and 0.01 higher than said refractive index of silica at a wavelength of operation.

13. The fiber intensity reducer of claim 11, wherein said another component for increasing a refractive index of said boron doped glass comprises germanium.

14. An optical system, comprising:
   a first and a second fiber intensity reducer each comprising a system fiber comprising a core and an outer cladding layer coupled to an unguided fiber intensity reducing (FIR) section, said FIR section comprising an unguided fiber having a first end and a second end attached at its first end to said system fiber, and a bond region between said first end of said unguided fiber and said system fiber, wherein said FIR section provides a softening point of at least 700° C. throughout and provides a sufficient transverse dimension along its entire length so that a beam of radiation received from said system fiber via said bond region expanding therein avoids an interface with the air along said entire length,
   said FIR section of said first fiber intensity reducer receiving a first fiber guided mode propagating in its system fiber and outputting a free space beam;
   an optical device aligned to receive said free space beam, said optical device operable to output a processed free space beam, and
   said second fiber intensity reducer facing said first fiber intensity reducer and aligned with said optical device to receive said processeds free space beam, said FIR section of said second fiber intensity reducer receiving said processed free space beam and causing another fiber guided mode to propagate in its system fiber.

15. The system of claim 14, wherein said optical device comprises a fiber coupled acousto-optic modulator.

16. The system of claim 14, wherein said optical device comprises an electro-optic modulator.

17. The system of claim 14, wherein said optical device comprises an optical isolator.

18. A method of forming a fiber intensity reducer, comprising:
   providing an end cap comprising an end cap fiber having a length from 2 to 10 mm and a system fiber having a core operable for guiding optical radiation;
   bonding said end cap fiber to said system core to form an end capped fiber, and
   sleeving said end capped fiber with a glass capillary,
   wherein said end cap provides a sufficient transverse dimension along its entire length so that a beam of radiation received from said system fiber via said bond region expanding in said end cap fiber avoids an interface with the air along said entire length.

19. The method of claim 18, wherein said bonding comprises fusion bonding.

20. The method of claim 18, wherein said capillary is formed from a material having a refractive index matching a refractive index of said end cap fiber and said core.

21. The method of claim 18, wherein said capillary provides a softening point of at least 700° C. throughout.

22. The method of claim 18, wherein said capillary comprises an outer silica shell and an inner portion comprising a lower softening point material as compared to a softening point of said silica shell.

23. The method of claim 22, wherein said refractive index of said lower softening point material is between said refractive index of silica and 0.01 higher than said refractive index of silica.

24. The method of claim 22, wherein said lower softening point material comprises boron doped glass and another component for increasing a refractive index of said boron doped glass for at least matching of a refractive index of silica.

25. The method of claim 24, wherein said another component for increasing a refractive index of said boron doped glass comprises germanium.

* * * * *